Figure 1:
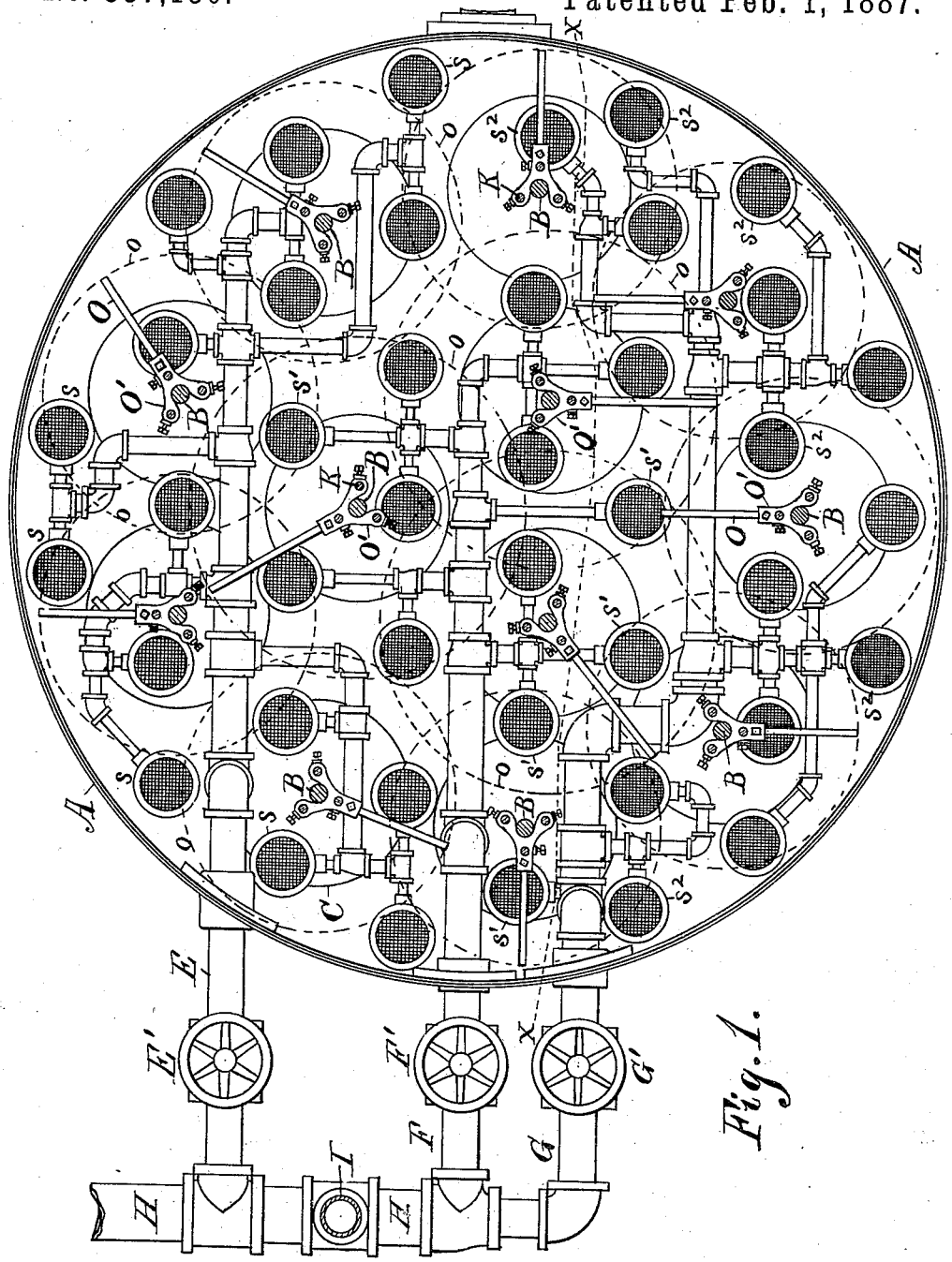

(No Model.) 3 Sheets—Sheet 1.

J. W. HYATT.
AGITATING FILTER BEDS IN SECTIONS.

No. 357,150. Patented Feb. 1, 1887.

Attest:
L. Lee
Henry J. Theberath

Inventor:
John W. Hyatt per
Crane & Miller, Attys.

(No Model.) 3 Sheets—Sheet 3.
J. W. HYATT.
AGITATING FILTER BEDS IN SECTIONS.
No. 357,150. Patented Feb. 1, 1887.

UNITED STATES PATENT OFFICE.

JOHN W. HYATT, OF NEWARK, NEW JERSEY.

AGITATING FILTER-BEDS IN SECTIONS.

SPECIFICATION forming part of Letters Patent No. 357,150, dated February 1, 1887.

Application filed May 4, 1886. Serial No. 201,040. (No model.)

*To all whom it may concern:*

Be it known that I, JOHN W. HYATT, a citizen of the United States, residing at Newark, Essex county, New Jersey, have invented certain new and useful Improvements in Agitating Filter-Beds in Sections, fully described and represented in the following specification and the accompanying drawings, forming a part of the same.

The object of this invention is to separately agitate different horizontal sections of a filter-bed when washing such sections separately; and the means I have devised consists, essentially, in a series of separate stirring devices arranged vertically at different points within the filter-bed and provided with separate actuating means projecting outside the top of the filter.

It also consists in the combination, with such a series of separate stirrers, of a series of separate washing-nozzles arranged at corresponding points beneath the filter-bed, and in a special construction for supporting the stirrers upon the vertical stay-rods between the filter-heads.

My improvement is particularly adapted for use with the filter described in my copending patent application, Serial No. 202,221, and is shown herein applied to such a filter, but may be adapted to others of different design.

In this filter the bed is retained in a vertical cylindrical casing, and the impure water is admitted near the top, and, after filtering downward, is drawn off through a series of separate outlet-strainers at the bottom. Such strainers are connected by suitable piping to three separate conduits upon the bottom of the filter, and thereby conduct the filtered water to a common discharge-pipe; but the water-supply is also connected with them in such manner that when it is desired to wash the filter-bed the filtration may be arrested, and any of the three groups of strainers may be used as inlets to direct a current of water upward into the substance of the filter-bed and discharge its impurities therefrom into a waste-pipe. Such method of washing the filter-bed in sections is claimed in my said copending application; and the object of my present construction is to effectually agitate that section of the filter-bed through which the upward current is directed, and to thereby secure the complete discharge of all the impurities therefrom.

It is obvious that a bed of fine filtering material must become greatly solidified or compacted by the operation of filtering under pressure, as intended with my apparatus, and the construction described herein is adapted to completely disintegrate all such compacted parts of the bed and to subject them to a thorough mingling with the current of water to have their impurities washed therefrom.

Figure 2:
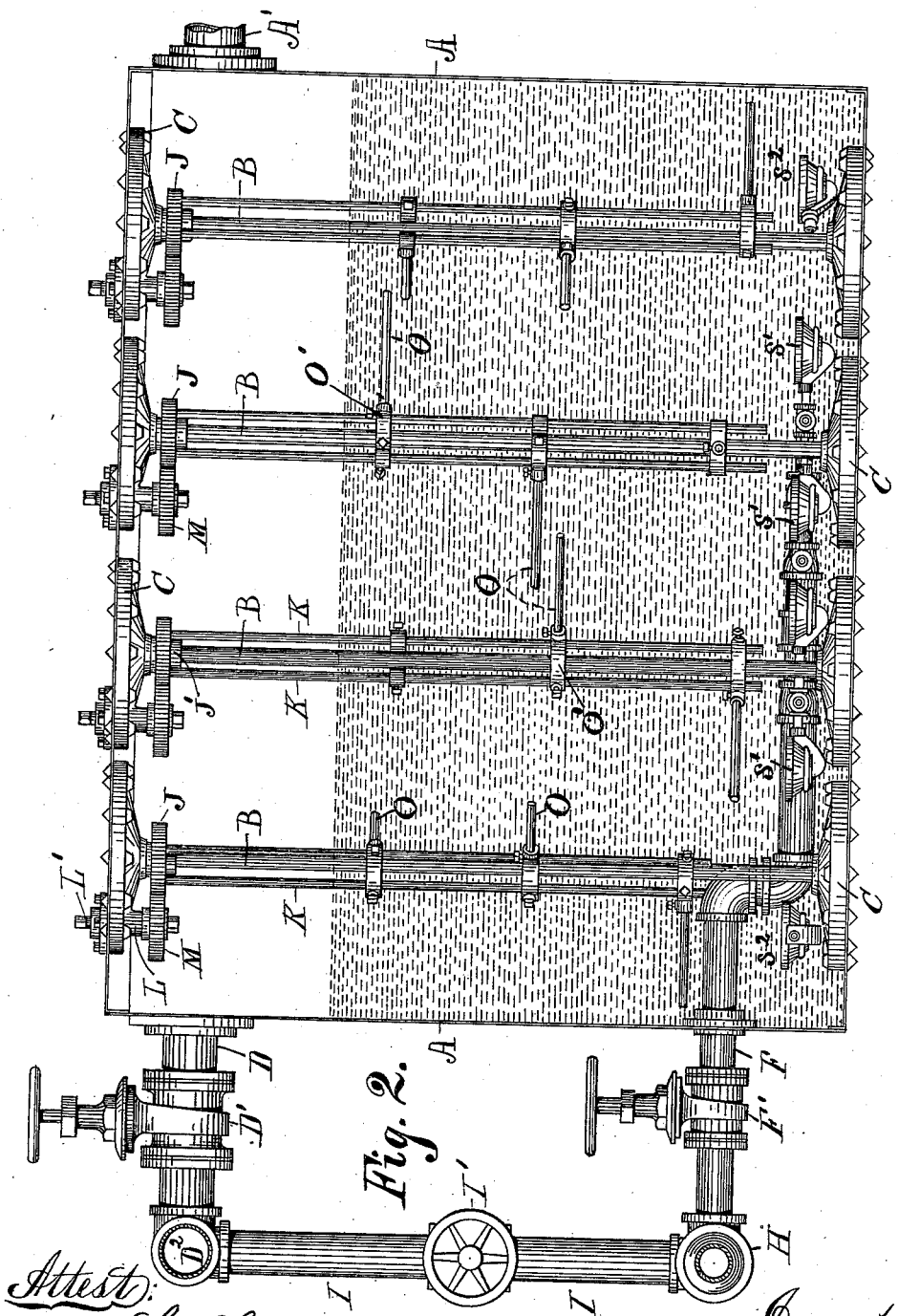
Figure 3:
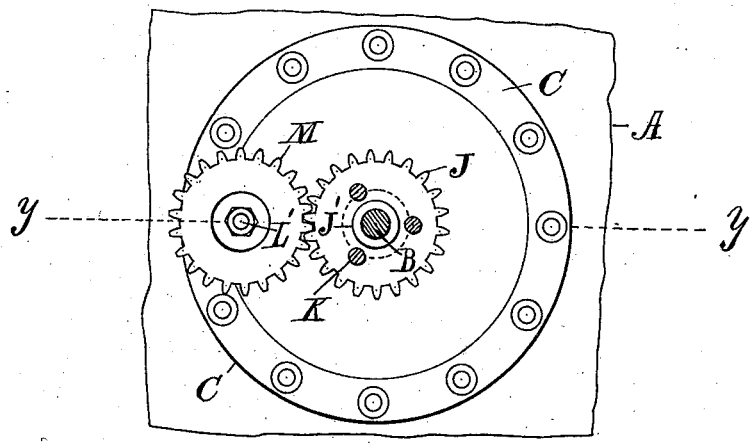
Figure 4:
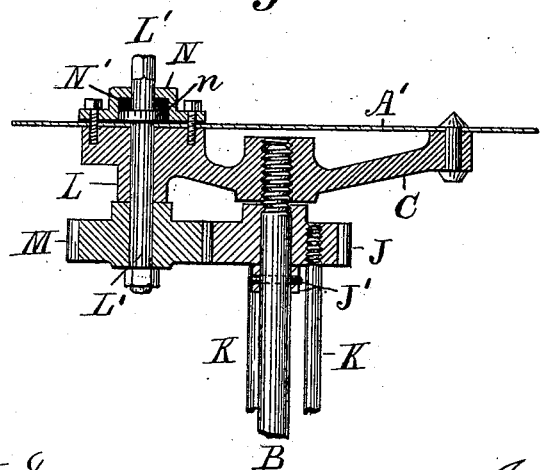

The construction will be understood by reference to the annexed drawings, in which Figure 1 is a plan of a filter in section on line $z\,z$ in Fig. 2. The latter view is an elevation of the same in section on line $x\,x$ in Fig. 1. Fig. 3 is an inverted plan of the gearing for one of the stirrers with part of the filter-head; and Fig. 4 is an elevation of the said gearing, partly in section, where hatched, on line $y\,y$ in Fig. 3.

A is the body or shell of the filter, of cylindrical form, with flat heads at the top and bottom.

B are stay-rods fitted between the heads and provided at opposite ends with flanges or foot-plates C, secured by rivets to the heads to brace them strongly.

D is an inlet-pipe provided with gate D', near the top of the filter, for introducing the impure water, and E F G are outlet-pipes conducting the filtered water from the bottom of the filter-bed to a discharge-pipe, H.

A pipe, I, provided with cock I', connects the inlet and waste pipes, and the supply of water to the filter under pressure is introduced at the junction $D^2$ of the pipes D and I, so that it may pass through either when the cock therein is opened. The pipes E, F, and G enter the filter near the bottom and communicate by various branches $r$ with three sets of strainers, $s\,s'\,s^2$.

During filtration the cocks E', F', and G' are opened, and the cock I' is closed, so that the inlet water may pass downward through the filter-bed K and escape through the strainers and the discharge-pipe H.

A waste-pipe, A', is provided near the top of the filter and should be supplied with a cock, (not shown in the drawings,) and when washing the filter-bed the current is reversed through the latter by closing the cock D', and directing the fluid through the pipe I successively into the pipes E F G and strainers s s' s². The discharge-pipe H would then be closed by a cock, (not shown in the drawings,) and the impurities would be discharged from the filter-bed by the upward current and pass outward with the waste water through the pipe A'. By arranging the strainers in a series of groups connected, respectively, with the pipes E, F, and G, I am enabled to wash separate sections of the bed independently, as claimed in my patent application, Serial No. 202,221; and the object of my present invention is to furnish a means of agitating such separate sections of the bed in a filter of this or any analogous construction.

The washing of the bed in sections is especially necessary in filters of large dimensions, and in such filters the bracing of the upper and lower ends of the filter is so important an element in the construction that it is necessary to reconcile the presence of the stay-rods with the means adopted for agitating the filter-bed. Such reconciliation is effected in the construction shown herein by mounting the stirring devices upon the stay-rods themselves; and to avoid making the stay-rods rotary to operate the stirring-arms, which would result in weakening their connection with the foot-plate C, I make the stirring devices movable upon the separate stay-rods, and provide means, as shafts extended through the head of the filter, for rotating each of the stirring devices separately, and thereby agitating any particular section of the bed, as may be desired. The stirring device shown herein consists in arms O, sustained radially to the stay-rods in sockets O', affixed upon hanger-bars, which are suspended parallel with the stay-rods from rotary gears J, mounted beneath the upper plates, C.

The gear J, as shown in the enlarged section in Fig. 4, is sustained loosely upon the stay-rod by a fixed collar, J', and the hanger-bars K, three in number, are screwed therein, and are tied together at different points in their length by sockets O', which are provided with three transverse holes and set-screws adapted to clamp the bars, and with a radial aperture and set-screw to hold the arm O. Each socket is open or forked upon one side between two of the holes, and the hanger-bars, as shown in Fig. 2, are not extended to the bottom of the filter, so that any of the sockets, in case of fracture, may thus be readily removed by slipping them downward, the fork or opening shown upon each of the sockets in Fig. 1 permitting the removal of the socket from the stay-rod after it has been detached from the hanger-bars. Adjacent to the gear J a bearing, L, is formed in the foot-plate C, and a shaft, L', is inserted therein, and provided upon its upper end with a head adapted to receive a wrench for turning a gear, M, which is secured to the inner end of the shaft and meshing with the gear J. A collar, n, (shown in Fig. 4,) is provided upon the shaft above the head of the filter shown at A' in said figure; and a cap, N, containing a packing, N', is bolted to the head over such collar to prevent any leakage from within the filter from passing the same.

Only one of the sockets and radial arms is shown upon each of the stay-rods B in Fig. 1; but the overlapping paths of such stay-rods (indicated by dotted circles o) show how completely the various stirrers operate to agitate the entire substance of the filter-bed.

The construction and arrangement of the stirrers is particularly adapted for stirring the bed when loosened by the reversal of the water-current, as it is at such time that its substance needs to be thoroughly broken up, that the impurities may be discharged therefrom, and the stirrers are therefore arranged, as far as practicable, so as to agitate the particular part of the bed which is loosened at any one time. Each gear is, however, adapted to be separately operated by actuating its attached shaft L', and any of the stirrers may therefore be actuated at pleasure when that part of the bed in which it is located is undergoing the cleansing operation.

The arrangement of the revolving parts upon the stay-rods enables them to work around the latter, whereas their location at any point between the stay-rods would bring them more or less into interference with the latter.

By inspection of the circle o in the central part of the plan it will be seen that the radius of the stirring arrangements is made nearly twice as great by such location as it could be if separate independent stirring-shafts were introduced midway between the three stay-rods, near the center of the filter. The arrangement of the parts is also very convenient for transportation and for their application to the interior of the filter-casing, and the casing itself may be thereby greatly lightened for easier transportation.

By my construction the gear J is applied to the stay-rod within one of the foot-plates. The rod is secured within the casing, and the stay-rod requires to have nothing affixed upon it except the gear and its collar J', when it is riveted by its foot-plates inside the filter-heads.

The hanger-bars and the forked sockets may be readily applied to the gears through a manhole after the filter-casing is erected in its permanent site, and the shafts L' and gears M may be also afterward applied, and the collars n packed, as already described.

I am well aware that it is not new to agitate the filter-bed by stirrers during the cleansing operation, and I do not therefore claim such stirrers specifically as my invention; but I am not aware that in any filter adapted to purify water under pressure separate stirring devices have been located in different parts of the bed and provided with separate means for actuating the stirrers independently, as I have described.

I hereby disclaim the subject-matter of my said patent application, Serial No. 202,221.

What I claim herein, and desire to secure by Letters Patent, is—

1. The combination, with a filter having separate inlets for washing the filter-bed in sections, of separate stirrers adapted to agitate such sections separately when washing, as and for the purpose set forth.

2. The combination, with a filter-bed provided with inlets and outlets to reverse the direction of the current for washing the bed, of several series or groups of strainers in the bottom of the bed, means for directing a current of water into each group separately to wash the bed in sections, and corresponding stirring devices located within such sections of the bed, and adapted to agitate such sections separately during the washing operation, as and for the purpose set forth.

3. The combination, with a closed filter having stationary upright stay-rods, of stirring devices mounted upon such stay-rods and adapted to rotate around the same, substantially as herein set forth.

4. The combination, with a closed filter having stationary upright stay-rods, of stirring devices mounted upon such stay-rods, and gearing, substantially as described, for rotating such stirring devices upon the rods, as and for the purpose set forth.

5. The combination, with a closed filter having upright stay-rods, of stirring devices mounted to rotate upon such stay-rods, a pair of gears within the filter for rotating each of such devices, and shafts extending through the head of the filter for turning such gears, as and for the purpose set forth.

6. The combination, with the filter-heads A', the stay-rod B, and foot-plate C, of the stirring device adapted to rotate upon the stay-rod, the bearing L in the foot-plate C, the gears J M, and the shaft mounted in the bearing and projected through the head A', as and for the purpose set forth.

7. The combination, with the filter-heads A' and the stay-rod B, of the gear J, the hanger-bars K, the sockets O', the arms O, and the gear L', having shaft projected through the head A, as and for the purpose set forth.

8. The combination, with a closed filter and the upright stay-rods affixed rigidly therein, of a gear applied to the rod near its upper end, a collar upon the rod to sustain the gear, and a stirring device suspended from the gear and rotated upon the rod thereby, as and for the purpose set forth.

9. The combination, with the closed filter and the upright stay-rods, of foot-plates secured upon the ends of the rods, a gear applied to the rod adjacent to the upper foot-plate, hanger-bars inserted in such gear, and removable stirring-arms affixed to such bars, as and for the purpose set forth.

10. The combination, with the closed filter and the upright stay-rods, of foot-plates secured upon the ends of the rods, a gear applied to the rod adjacent to the upper foot-plate, hanger-bars inserted in such gear and terminated above the bottom of the filter, removable forked sockets clamped upon such bars, and stirrer-arms projected from such sockets, as and for the purpose set forth.

In testimony whereof I have hereunto set my hand in the presence of two subscribing witnesses.

JOHN W. HYATT.

Witnesses:
CHAS. C. MCBRIDE,
THOS. S. CRANE.